US012767361B2

(12) United States Patent
Ito et al.

(10) Patent No.: US 12,767,361 B2
(45) Date of Patent: Oct. 20, 2026

(54) TAKEOFF/LANDING GUIDANCE APPARATUS, TAKEOFF/LANDING GUIDANCE METHOD, AND TAKEOFF/LANDING GUIDANCE SYSTEM

(71) Applicant: Hitachi, Ltd., Tokyo (JP)

(72) Inventors: Takahiro Ito, Tokyo (JP); Mitsuru Matsubara, Tokyo (JP); Mikio Bando, Tokyo (JP); Taku Shimizu, Tokyo (JP)

(73) Assignee: HITACHI, LTD., Tokyo (JP)

(*) Notice: Subject to any disclaimer, the term of this patent is extended or adjusted under 35 U.S.C. 154(b) by 258 days.

(21) Appl. No.: 18/729,871

(22) PCT Filed: Dec. 13, 2022

(86) PCT No.: PCT/JP2022/045879
§ 371 (c)(1),
(2) Date: Jul. 17, 2024

(87) PCT Pub. No.: WO2023/149096
PCT Pub. Date: Aug. 10, 2023

(65) Prior Publication Data

US 2026/0188125 A1 Jul. 2, 2026

(30) Foreign Application Priority Data

Feb. 1, 2022 (JP) ................................ 2022-014112

(51) Int. Cl.
*G08G 5/52* (2025.01)
*G05D 1/652* (2024.01)
(Continued)

(52) U.S. Cl.
CPC ............... *G08G 5/52* (2025.01); *G05D 1/652* (2024.01); *G05D 1/6545* (2024.01); *G08G 5/54* (2025.01);
(Continued)

(58) Field of Classification Search
CPC ............ G08G 5/52; G08G 5/54; G05D 1/652; G05D 1/6545; G05D 1/633; G05D 2109/254
See application file for complete search history.

(56) References Cited

U.S. PATENT DOCUMENTS

2006/0244637 A1* 11/2006 Baranov ............. G01C 23/005 340/968
2015/0235559 A1* 8/2015 Alekseev ............... G05D 1/104 701/120
2020/0111375 A1* 4/2020 Garden .................... G08G 5/20

FOREIGN PATENT DOCUMENTS

JP 4043133 B2 2/2008

OTHER PUBLICATIONS

International Search Report of PCT/JP2022/045879 dated Jan. 31, 2023.

* cited by examiner

*Primary Examiner* — Behrang Badii
(74) *Attorney, Agent, or Firm* — MATTINGLY & MALUR, PC

(57) ABSTRACT

A guidance device for a vertical takeoff and landing aircraft includes: a detection unit that acquires the location of each aircraft in a control area; a guidance route setting unit; a virtual exclusive area setting unit that sets a virtual exclusive area around each aircraft; a control area state management unit; and a communication unit. When a distance between virtual exclusive areas is less than or equal to a warning state threshold, the state of the control area is set to an alert state, and warning information is transmitted. When the virtual exclusive areas overlap with each other, or when the distance therebetween is less than or equal to an emergency state threshold, the state of the control area is set to an emergency state, and the communication unit transmits, to an aircraft deviating largely from the guidance route, information indi-
(Continued)

cating that the aircraft is designated as an uncontrolled aircraft.

13 Claims, 14 Drawing Sheets

(51) Int. Cl.
*G05D 1/654* (2024.01)
*G08G 5/54* (2025.01)
*G05D 1/633* (2024.01)
*G05D 109/25* (2024.01)

(52) U.S. Cl.
CPC ....... *G05D 1/633* (2024.01); *G05D 2109/254* (2024.01)

TAKEOFF/LANDING GUIDANCE APPARATUS, TAKEOFF/LANDING GUIDANCE METHOD, AND TAKEOFF/LANDING GUIDANCE SYSTEM

TECHNICAL FIELD

The present invention relates to a takeoff/landing guidance apparatus, takeoff/landing guidance method, and takeoff/landing guidance system for guiding a flying object such as a vertical takeoff/landing aircraft to take off/make a landing.

BACKGROUND ART

In expectation of accomplishing various transportation tasks, for example, reducing the traffic congestion in urban areas and environmental loads, securing transportation means to depopulated areas, and the like, the demand for the small electric vertical takeoff and landing aircraft (eVTOL) has been growing. The eVTOL is a flying object capable of flying adapted to various flight routes including vertical takeoff/landing by individually controlling motors provided for multiple rotary wings. In the situation assumed to have multiple eVTOLs flying along various routes individually, the flight control from the airport is considered necessary to allow the respective eVTOLs to take off/land from/on the airport safely and stably.

Patent Literature 1 discloses technology as a generally employed art relating to the ground facility for flight control of general aircrafts. Patent Literature 1 discloses the landing aircraft approach alarm device as described below with reference to claim 1 and the paragraph 0039. The device is configured to issue alarms to multiple aircrafts which are about to land on parallel-arranged multiple runways when the distance between the aircrafts, or the distance predicted based on the speed and the acceleration becomes shorter than the distance determined as a value indicating abnormal proximity. When the abnormal state is relieved, the device stops issuing the alarm.

CITATION LIST

Patent Literature

Patent Literature 1: Japanese Patent No. 4043133

SUMMARY OF INVENTION

Technical Problem

The use of the landing aircraft approach warning device as disclosed in Patent Literature 1 issues the alarm with respect to abnormal proximity of the landing aircrafts based on the path predicted from each position, speed, and acceleration of the respective aircrafts. This expedites the airport flight controller to estimate the situation of the landing aircraft.

As FIGS. 1 and 2 of Patent Literature 1 clearly show, the disclosed landing aircraft approach warning device controls the aircraft such as a passenger jet having its approach direction to the runway limited. The disclosed device is not configured to perform the flight control of eVTOLs in the situation where a large number of aircrafts take off and land concurrently along various flight routes. The landing aircraft approach warning device as disclosed in Patent Literature 1 is configured to provide the airport controller with the control information, but is not configured to be operated in expectation of notifying the respective flying objects of safe flight routes.

It is an object of the present invention to provide a takeoff/landing guidance apparatus, takeoff/landing guidance method, and takeoff/landing guidance system for supporting the flight control above the airport, and notifying the respective flying objects of the control information for safe takeoff/landing of the vertical takeoff/landing aircraft represented by the eVTOL.

Solution to Problem

In order to attain the object as described above, the takeoff/landing guidance apparatus according to the present invention is configured to guide a flying object in a control area for takeoff/landing operations. The takeoff/landing guidance apparatus includes a flying object position detection section for acquiring a position of each flying object in the control area, a guidance route setting section for setting a guidance route for each of the flying objects, a virtual exclusive area setting section for setting a virtual exclusive area around each of the flying objects, a control area state management section for managing a state of the control area, and a communication section for communication with each of the flying objects. If a distance between the virtual exclusive areas is equal to or less than an alarm state threshold value, the control area state management section sets a state of the control area into a warning state, and the communication section transmits alarm information to the flying object. If the virtual exclusive areas overlap with each other, or a distance between the virtual exclusive areas is equal to or less than an emergency state threshold value which is smaller than the alarm state threshold value, the control area state management section sets the state of the control area into an emergency state, and the communication section transmits information indicating designation of the flying object as an uncontrolled flying object to the flying object largely deviating from the guidance route.

Advantageous Effects of Invention

The takeoff/landing guidance apparatus, takeoff/landing guidance method, and takeoff/landing guidance system allow support of the flight control above the airport, and notification of the respective flying objects of the control information for the safe takeoff/landing of the vertical takeoff/landing aircraft represented by the eVTOL.

DESCRIPTION OF EMBODIMENTS

Figure 1:
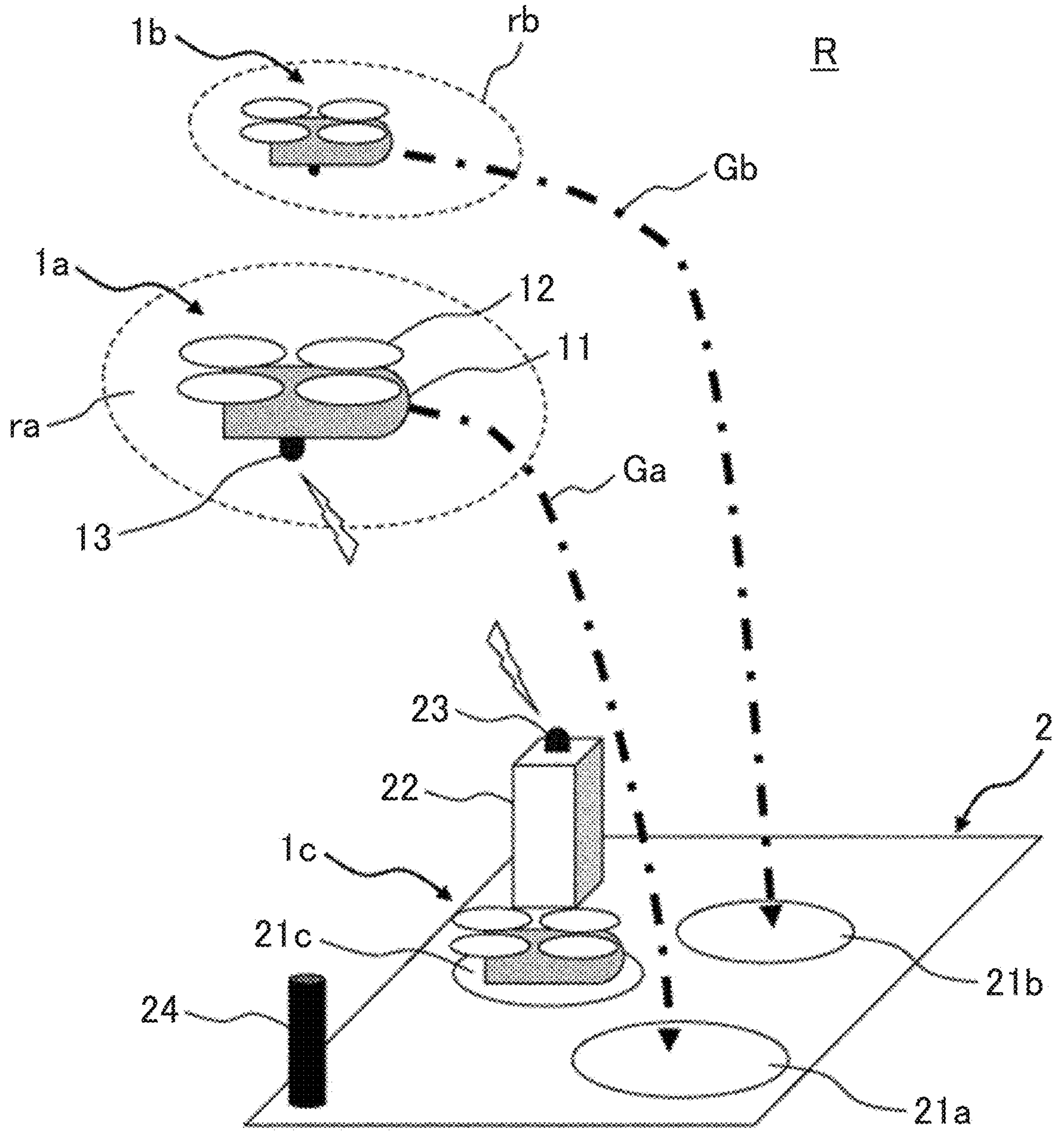
FIG. 1 is a conceptual view indicating a takeoff/landing guidance system according to a first embodiment.

Embodiments according to the present invention are described referring to the drawings. The respective components of the present invention do not necessarily have to be individually independent from one another. It is also possible to have one component composed of multiple members, each of multiple components composed of a single member, a specific component formed as a part of another component, and a part of the specific component overlapped with a part of another component.

First Embodiment

<Outline Structure of Takeoff/Landing Guidance System>

FIG. 1 is a conceptual view of a takeoff/landing guidance system according to a first embodiment of the present invention. The takeoff/landing guidance system is configured to control flight of a flying object 1 in a control area R set over an airport 2. Especially, upon takeoff/landing of multiple flying objects 1, the system is adapted to prevent contact between the flying objects by guiding each of those flying objects to the appropriate route.

The flying object 1 as a small vertical takeoff/landing aircraft represented by the eVTOL includes a main body 11 having a pilot or the like on board, and packages mounted, multiple rotary wings 12 each rotationally driven by the motor, and a flying-object-side communication section 13 for outside communication. The rotary wing 12 may be configured to be rotationally driven by an engine.

FIG. 1 illustrates the flying objects 1 to be controlled by the takeoff/landing guidance system, specifically, flying objects 1*a*, 1*b* flying to the airport 2, and a flying object 1*c* kept standby on the airport 2. The flying object 1 except those described above (for example, a flying object 1*d* which has taken off from the airport 2) may also be made a control target.

The airport 2 is provided with a runway strip 21 indicating the landing position of each flying object 1. The airport 2 further includes a control facility 22 for controlling the flying object 1 in a control area R, a communication section 23 at the airport side for communication between the control facility 22 and the flying object 1, and an environment information acquisition section 24 for acquiring information about the environment surrounding the airport 2. The environment information includes weather information around the airport 2 (weather, temperature, amount of rainfall, wind speed), information about the runway strip 21 (use/unuse by other flying objects, presence/absence of physical obstacle), and an availability condition dependent on presence/absence of construction work).

Referring to FIG. 1, in the embodiment, like the runway strip 21*a* as the runway strip 21 for the flying object 1*a*, a suffix a, b, or c is added to the reference sign of the constituent. For example, the flying object 1 is expressed as 1*a*, 1*b*, 1*c* for distinguishment among the flying objects.

As indicated by broken lines in FIG. 1, a virtual exclusive area r is set as an individual exclusive area corresponding to each of the flying objects 1 flying in the control area R. The takeoff/landing guidance apparatus 200 in the control facility 22 sets the virtual exclusive area r as an area for safely guiding takeoff/landing of multiple flying objects 1 to prevent those flying objects 1 from flying in the same area at the same time.

The takeoff/landing guidance apparatus 200 sets a guidance route G for guiding each of the landing flying objects 1 to the runway strip 21. As FIG. 1 illustrates, the guidance route G is expressed in the form of a continuous line. The takeoff/landing guidance apparatus 200 may be configured to set the guidance route G by combining multiple dots defined by the latitude, longitude, and altitude.

<Function Structures of Flying Object Control Device 100 and Takeoff/Landing Guidance Apparatus 200>

Figure 2:
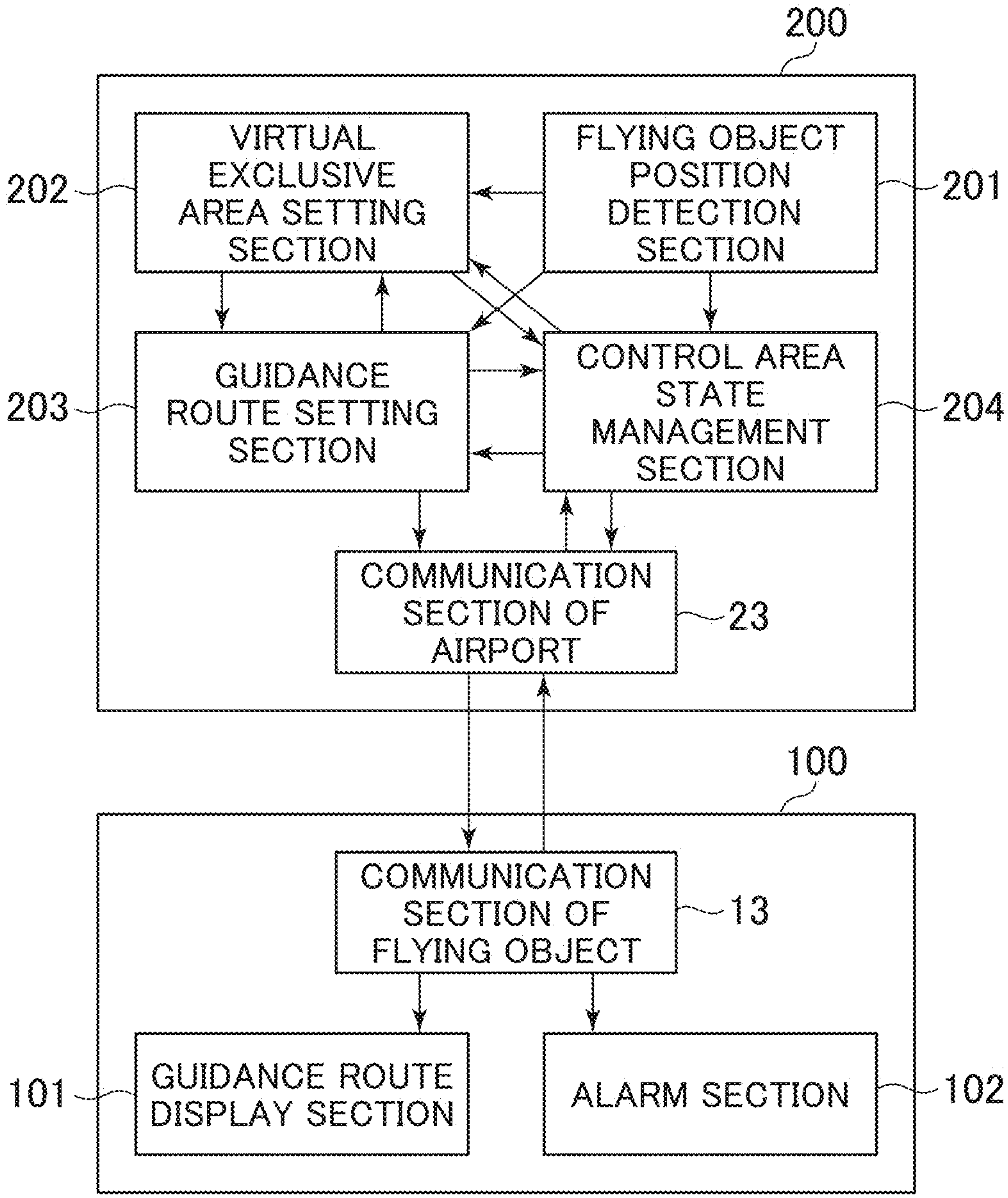
FIG. 2 is a functional block diagram of a flying object control device and a takeoff/landing guidance apparatus according to the first embodiment.

Referring to the function block diagram of FIG. 2, an explanation is made with respect to each function structure of the flying object control device 100 built in the flying object 1, and the takeoff/landing guidance apparatus 200 built in the control facility 22.

As the diagram shows, the flying object control device 100 includes a guidance route display section 101, and an alarm section 102 in addition to the flying-object-side communication section 13. The takeoff/landing guidance apparatus 200 includes a flying object position detection section 201, a virtual exclusive area setting section 202, a guidance route setting section 203, and a control area state management section 204 in addition to the airport-side communication section 23 as described above. Details of the respective devices are described one by one as below.

<Takeoff/Landing Guidance Apparatus 200>

The flying object position detection section 201 detects a current position of the flying object 1 in the control area R based on the position information of the flying object, which has been received from the flying object 1, and the position information of the flying object 1, which has been acquired by the sensor such as the radar of the control facility 22.

The virtual exclusive area setting section 202 sets the virtual exclusive area r for each of the flying objects 1 based on the information about the current position of the flying object 1, which has been detected by the flying object position detection section 201. The detailed method for setting the virtual exclusive area r is described later.

The guidance route setting section 203 sets the landing guidance route G for the flying object 1 (flying objects 1*a*, 1*b* as illustrated in FIG. 1) which makes a landing on the runway strip 21, and the takeoff guidance route G (not shown) for the flying object 1 (flying object 1*c* as illustrated in FIG. 1) which is about to take off from the runway strip 21. The detailed method for setting the guidance route G is described later.

The control area state management section 204 generates the state information of the control area R, and management information (alarm information to be described later) for transmission to the flying object 1 based on the position of the flying object 1 in the control area R, the virtual exclusive area r, the guidance route G, and the information acquired from the flying object 1. The detailed method for generating the above-described information is described later.

<Flying Object Control Device 100>

The guidance route display section 101 is a human interface such as a display, which allows the pilot to recognize the guidance route G transmitted from the takeoff/landing guidance apparatus 200.

The alarm section 102 is a human interface which notifies the pilot, or the like of the alarm information transmitted from the takeoff/landing guidance apparatus 200 in the form of voice, light emission, characters, and images. The single display unit may be shared by the guidance route display section 101 and the alarm section 102.

Figure 3:
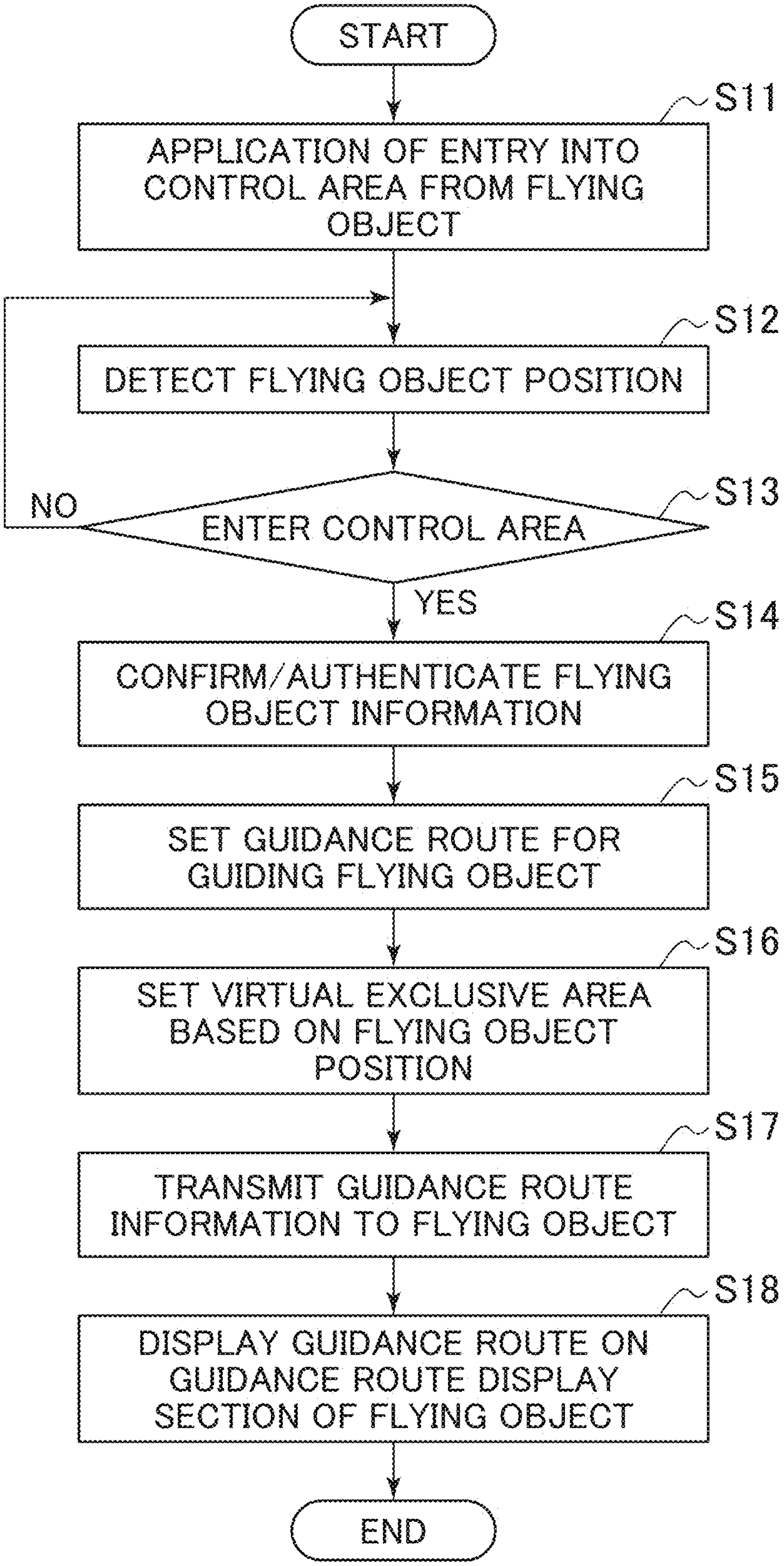
FIG. 3 is a flowchart for guiding entry of the flying object into the control area according to the first embodiment.
Figure 4:
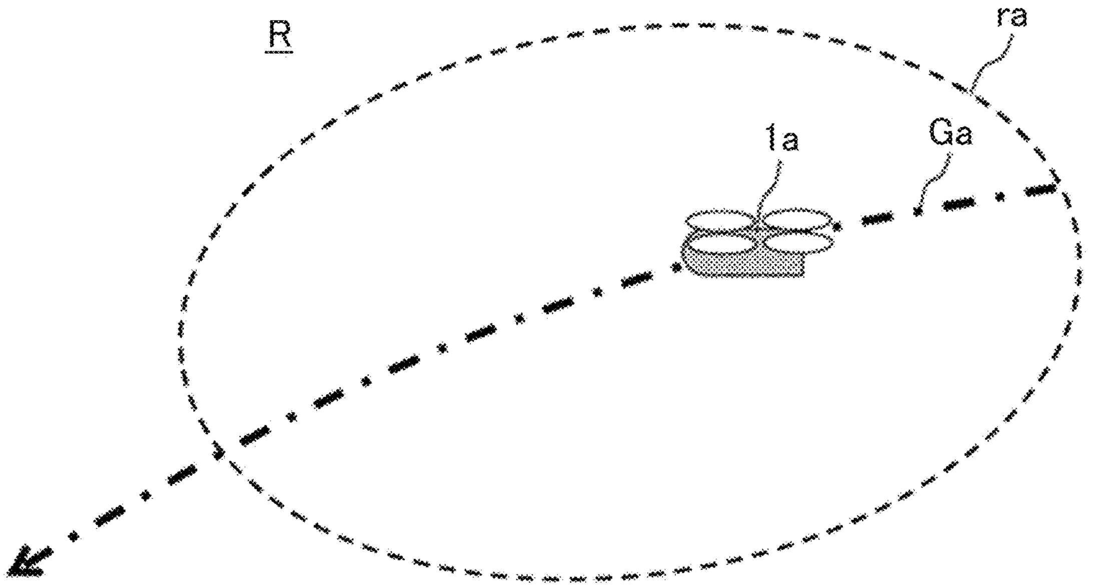
FIG. 4 is a conceptual view indicating a relationship between a guidance route set by the process as shown in FIG. 3, and a virtual exclusive area.

Example of Process for Initial Setting of Guidance Route G and Virtual Exclusive Area r Referring to FIGS. 3 and 4, an explanation is made with respect to the process executed by the takeoff/landing guidance apparatus 200 for initial setting of the virtual exclusive area r and the guidance route G upon entry of the flying object 1 into the control area R from the outside of the control area, and the method for using the information by the flying object 1.

Referring to the flowchart of FIG. 3, described is the process for operating the takeoff/landing guidance system of the embodiment in the situation before and after entry of the flying object 1*a* as shown in FIG. 1 into the control area R.

In step S11, the flying-object-side communication section 13 of the flying object control device 100 built in the flying object 1*a* transmits an application of entry into the control area R before its entry into the control area R. As a result, the airport-side communication section 23 of the takeoff/landing guidance apparatus 200 receives the application of entry into the control area R from the flying object 1*a* which is approaching the control area R.

In step S12, the flying object position detection section 201 detects the current position of the flying object 1*a* by implementing any of the methods as described above.

In step S13, the takeoff/landing guidance apparatus 200 compares the current position of the flying object 1*a* with the control area R. If the flying object 1*a* has already entered the control area R, the process proceeds to step S14. If the flying object 1*a* has not entered the control area R yet, the process executes step S13 repeatedly.

In step S14, the takeoff/landing guidance apparatus 200 authenticates the flying object 1*a* by collating the information of the preliminarily applied flight plan of the flying object 1*a*. The flight plan information may be derived from a system for integrating whole flight plans, if any.

In step S15, the guidance route setting section 203 sets the guidance route Ga which allows safe landing of the flying object 1*a* on the runway strip 21*a* based on the current position of the flying object 1*a*, and the position of the runway strip 21*a* prepared for the flying object 1*a*. The guidance route Ga may be set in consideration of the structure and capability of the flying object 1*a*, another flying object 1*b* in the control area R and a corresponding virtual exclusive area rb, weather states of the control area R, and conditions of the surrounding area.

In step S16, the virtual exclusive area setting section 202 sets a virtual exclusive area ra surrounding the flying object 1*a* based on at least the information of the flying object 1*a* with respect to its position, speed, and state of the airframe, the guidance route Ga, and the information of the virtual exclusive area rb of another flying object 1*b* which has been already flying in the control area R.

The relationship between the guidance route Ga and the virtual exclusive area ra, which have been set by executing steps S15 and S16 is described referring to the schematic view of FIG. 4. If the guidance route Ga is set as illustrated in the drawing, the virtual exclusive area ra is formed along the guidance route Ga to include the current position of the flying object 1*a*. As a result, the virtual exclusive area ra has a shape extending in the advancing direction of the flying object 1*a*.

If another flying object 1*b* exists around the flying object 1*a* as illustrated in FIG. 1, basically, the virtual exclusive area ra is set to be separated from the virtual exclusive area rb by a predetermined distance or longer. If the flying object 1*a* finds an obstacle in the subject area, the virtual exclusive area ra is set to have its size sufficient to allow turning operation with a freedom degree to a certain extent for taking an avoiding action. The size of the area may be set in consideration of the structure and capability of the flying object 1*a*, the weather state of the control area R, and the condition of the surrounding area.

Figure 10:
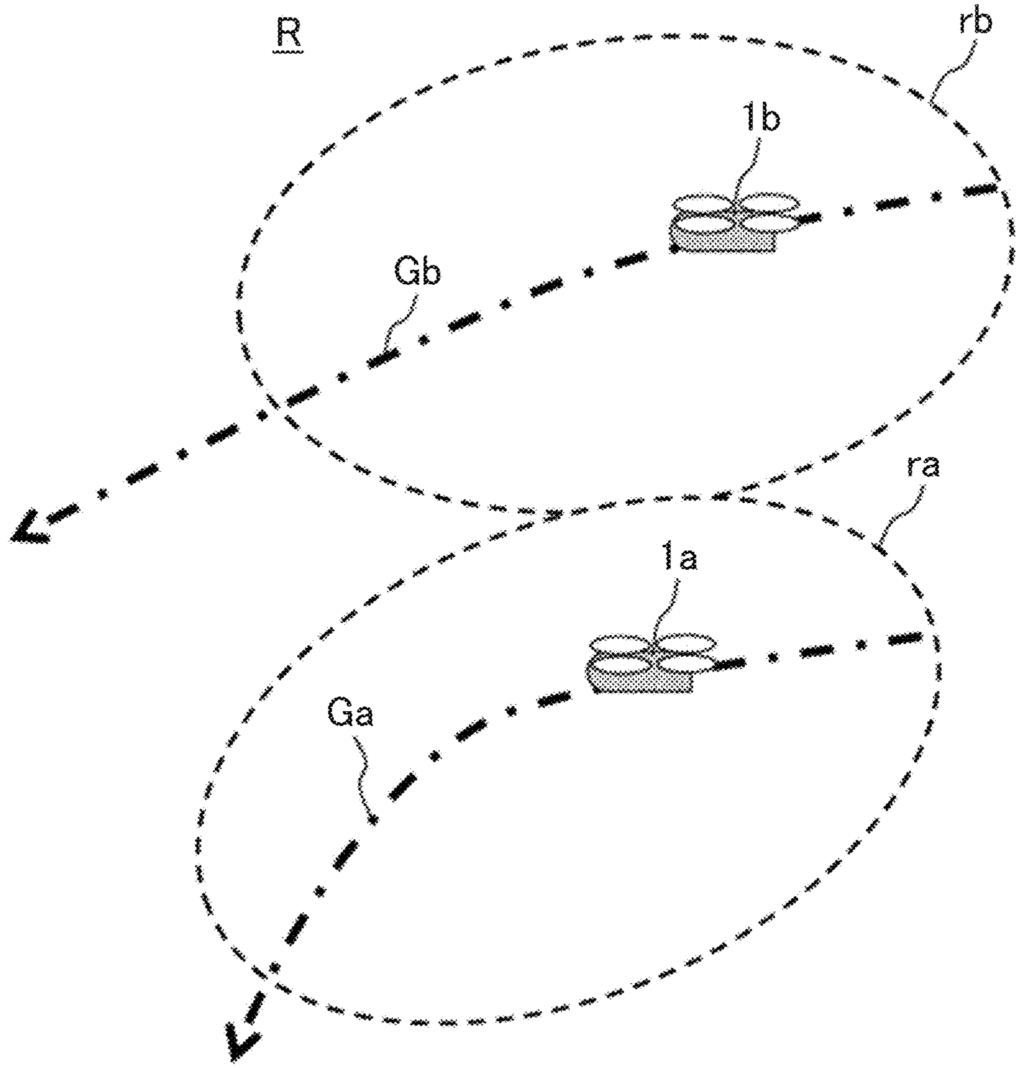
FIG. 10 is a conceptual view indicating that the virtual exclusive areas overlap with each other.

If the virtual exclusive area ra which satisfies all the conditions cannot be set, setting of the virtual exclusive area ra partially overlapped with the virtual exclusive area rb is allowed (to be described in detail referring to FIG. 10).

Then in step S17, the airport-side communication section 23 transmits the set guidance route Ga to the flying-object-side communication section 13 of the flying object 1*a*.

In step S18, the guidance route display section 101 of the flying object 1*a* displays the guidance route Ga received from the takeoff/landing guidance apparatus 200 to urge the pilot to make a flight along the guidance route Ga.

Each of the flying objects 1 entering the control area R is allocated to a unique guidance route G and a unique virtual exclusive area r so that the takeoff/landing guidance apparatus 200 manages the route that allows safe landing of the flying object 1.

Figure 5:
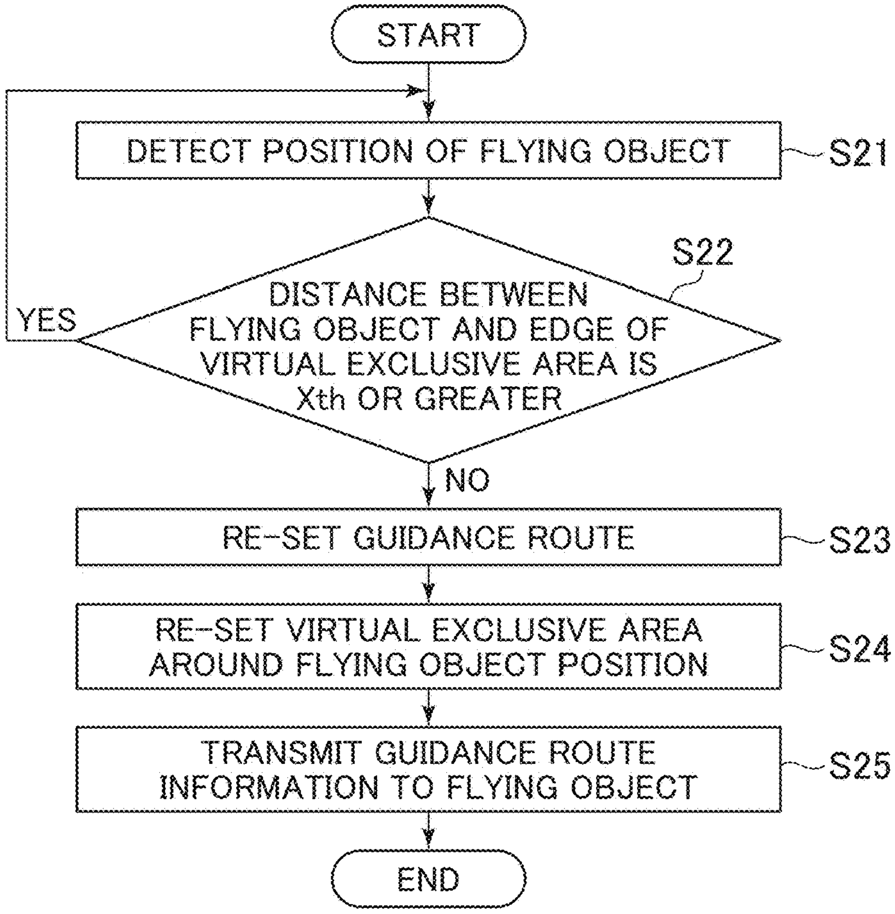
FIG. 5 is a flowchart for guiding the flying object during flight in the virtual exclusive area according to the first embodiment.
Figure 6:
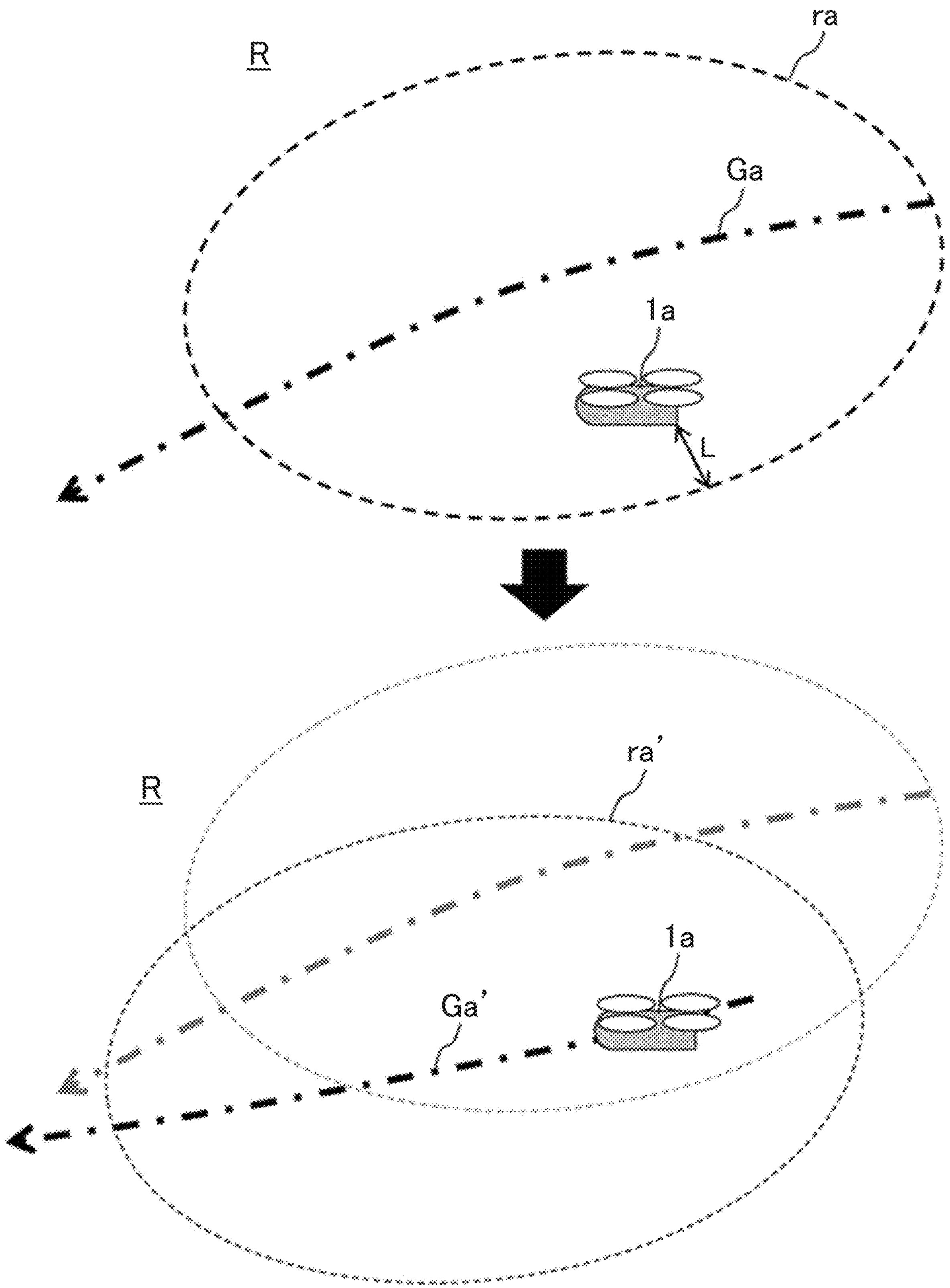
FIG. 6 is a conceptual view indicating a relationship between a guidance route re-set by the process as shown in FIG. 5, and a virtual exclusive area.

Example of Process for Updating Guidance Route G and Virtual Exclusive Area r Referring to FIGS. 5 and 6, described are the method for re-setting the virtual exclusive area r performed by the takeoff/landing guidance apparatus 200, and the method for using the information by the flying object 1 if the flying object 1 to which the guidance route G and the virtual exclusive area r have been allocated by executing the process as represented by the flowchart of FIG. 3.

With reference to the flowchart of FIG. 5, the process for operating the takeoff/landing guidance system of the embodiment is described by taking the condition where the flying object 1*a* shown in FIG. 1 is further approaching the runway strip 21*a* as an example.

In step S21, the flying object position detection section 201 of the takeoff/landing guidance apparatus 200 detects a current position of the flying object 1*a* flying in the control area R.

In step S22, the control area state management section 204 calculates the shortest distance L from the flying object 1*a* to an edge of the virtual exclusive area ra based on a shape of a boundary between the current position of the flying object 1*a* and the virtual exclusive area ra, and determines whether the distance L is equal to or greater than a threshold value $L_{th}$. If $L \geq L_{th}$, the process returns to step S21. If $L < L_{th}$, the process proceeds to step S23.

In step S23, the guidance route setting section 203 re-sets the guidance route Ga on the basis of the current position of the flying object 1a. As clearly understood from the above, the threshold value $L_{th}$ serves as the threshold to be used for re-setting the virtual exclusive area ra. It is possible to re-set the guidance route Ga while considering the structure and capability of the flying object 1a, another flying object 1b in the control area R and the corresponding virtual exclusive area rb, the weather state of the control area R, and the condition of the surrounding area in addition to the direction of landing on the runway strip 21a designated upon entry into the control area R.

In step S24, the virtual exclusive area setting section 202 re-sets the virtual exclusive area ra on the premise of the guidance route Ga that has been re-set in step S23. The virtual exclusive area ra is re-set in consideration of the circumstance equivalent to the one when executing step S16 as described above.

Execution of steps S23, S24 re-sets the guidance route and the virtual exclusive area to Ga' and ra', respectively for the flying object 1a deviating from the original guidance route Ga at a time point when the relationship becomes $L<L_{th}$. FIG. 6 illustrates an example that the guidance route and the virtual exclusive area are re-set to Ga' and ra', respectively as a result of deviation of the flying object 1a from the guidance route Ga. Even in the case where the flying object 1a is flying following the guidance route Ga, it is obvious that the virtual exclusive area is re-set to ra' at a time point when the flying object 1a approaches the edge of the virtual exclusive area ra.

In step S25, the airport-side communication section 23 transmits the re-set guidance route G' to the flying-object-side communication section 13 of the flying object 1. The pilot is notified of the latest guidance route G' in the way similar to step S18 as shown in FIG. 3.

The guidance route G and the virtual exclusive area r are re-set in accordance with the positional relationship between the flying object 1 and the virtual exclusive area r. This makes it possible to generate the state where another flying object 1b does not exist around the flying object 1a to prevent the mutual approach of multiple flying objects 1. Accordingly, each of the pilots operates the flying object 1 following the latest guidance route G' to allow safe takeoff/landing of the respective flying objects 1.

<Existence of Multiple Virtual Exclusive Areas r in the Control Area R>

Figure 7:
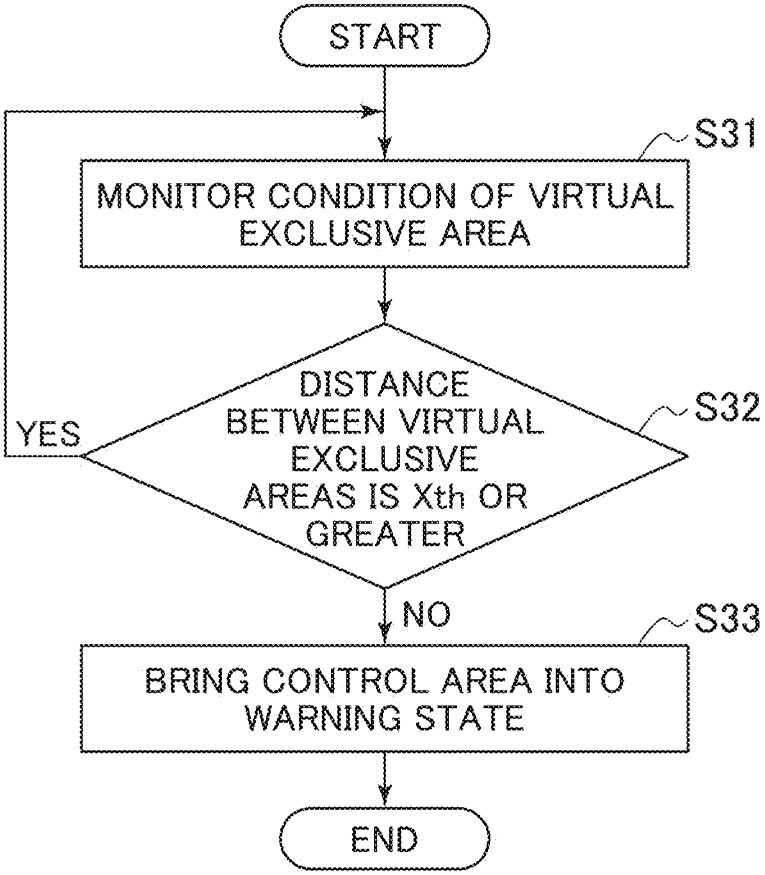
FIG. 7 is a flowchart for managing the state where the control area is in the normal state.
Figure 8:
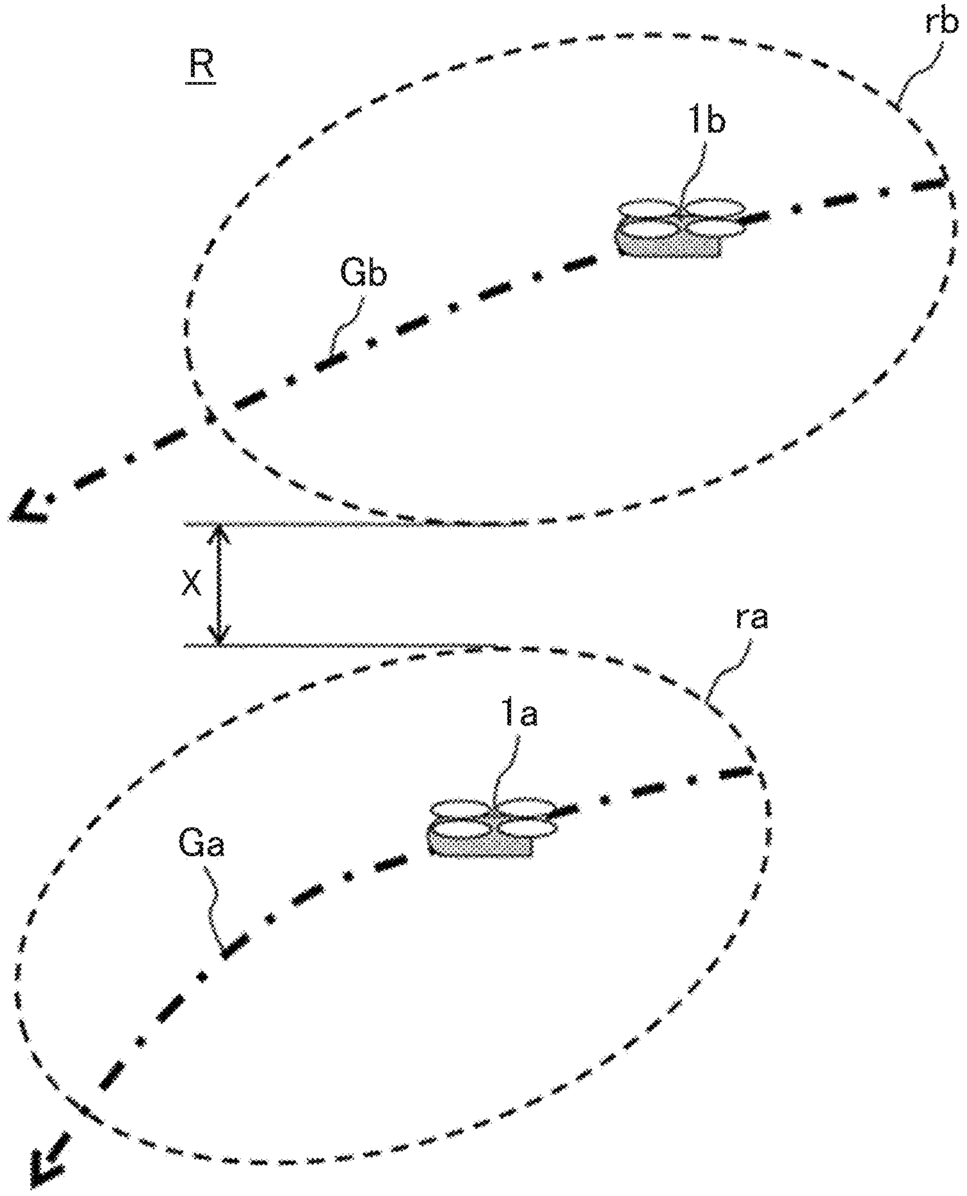
FIG. 8 is a conceptual view indicating the distance between the virtual exclusive areas.

Referring to FIGS. 7 and 8, described is a control area state to be managed by the takeoff/landing guidance apparatus 200 in the presence of multiple virtual exclusive areas r in the control area R.

With reference to the flowchart shown in FIG. 7, described is the process of operating the takeoff/landing guidance system of the embodiment by taking the condition where the virtual exclusive areas ra, rb are set for the flying objects 1a, 1b as shown in FIG. 1, respectively as an example. It is assumed that the control area state at the time point for starting the flowchart is in the "normal state".

In step S31, the control area state management section 204 of the takeoff/landing guidance apparatus 200 monitors each state of the virtual exclusive areas ra, rb in the control area R.

In step S32, the control area state management section 204 calculates the distance X between the virtual exclusive areas ra and rb. It is determined whether the calculated distance X is equal to or greater than the warning state threshold value $X_{th}$. If $X \geq X_{th}$ (the virtual exclusive areas ra and rb are separated by a sufficient distance), steps S31 and S32 are executed repeatedly. If $X<X_{th}$ (the virtual exclusive areas ra and rb are close to each other), the process proceeds to step S33.

In step S33, the control area state management section 204 changes the management state of the control area R from the "normal state" to the "warning state". The process to be executed under the warning state is described later.

The control area state management section 204 is capable of changing the management state of the control area R in accordance with the distance between the virtual exclusive areas.

<Operation of Takeoff/Landing Guidance System Under Warning State>

Figure 9:
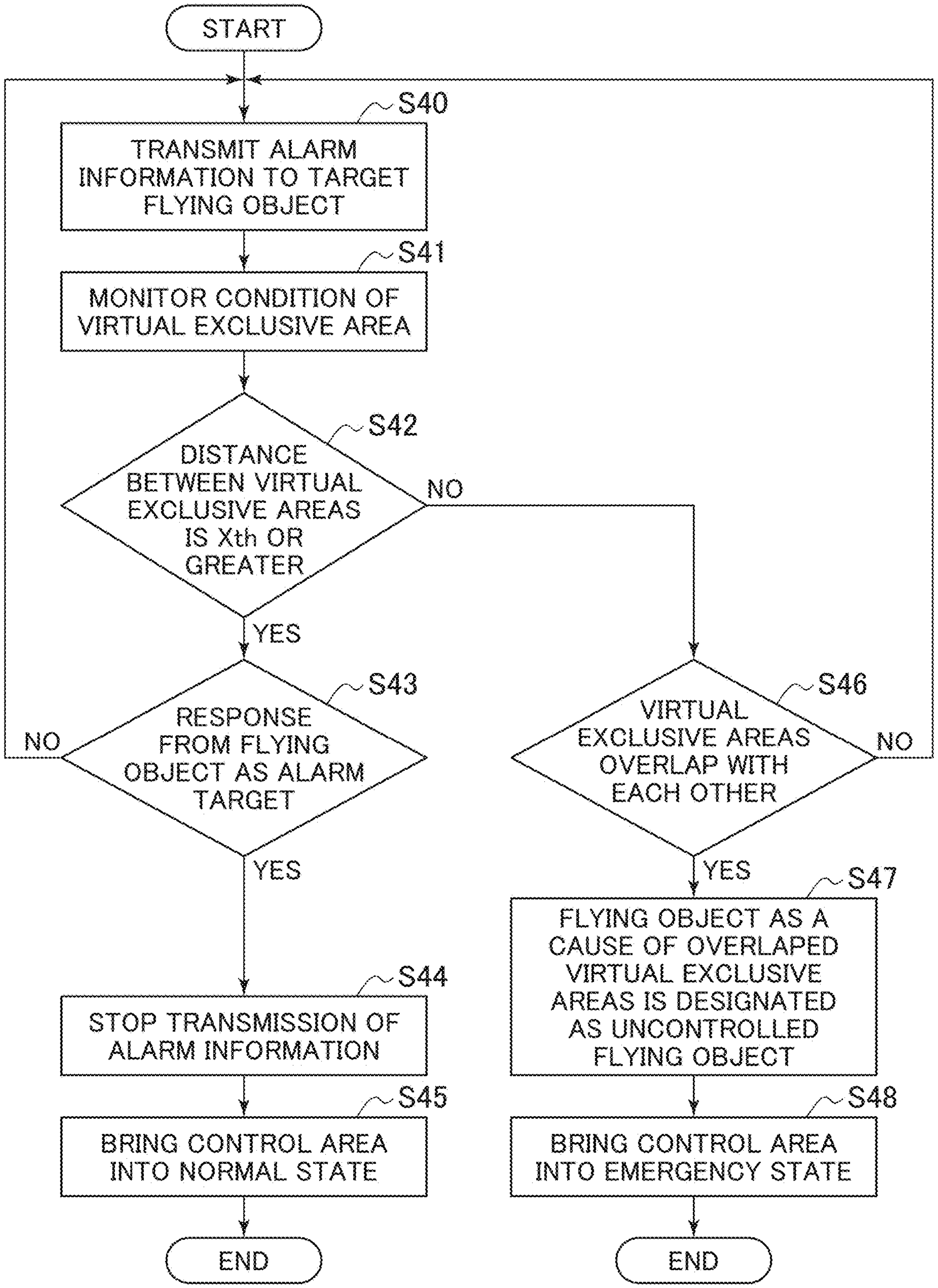
FIG. 9 is a flowchart for managing the state where the control area is in the warning state.

FIG. 9 is a flowchart of the process for operating the takeoff/landing guidance system upon transition of the state of the control area R into the warning state by executing the process as represented by FIG. 7. FIG. 10 is a schematic view illustrating that the virtual exclusive area rb overlaps with the virtual exclusive area ra which has been re-set to cope with large deviation of the flying object 1a from the guidance route Ga.

In step S40 of FIG. 9, the control area state management section 204 transmits the alarm information to the respective flying-object-side communication sections 13 of the flying objects 1a and 1b via the airport-side communication section 23. The transmission destination of the alarm information may only be the flying object 1a which is largely deviating from the guidance route Ga. In this case, the alarm section 102 of the flying object 1a which has received the alarm information notifies the pilot of the situation that the virtual exclusive areas mutually approach using sound or light based on the alarm information to urge the pilot to return to the guidance route Ga set by the takeoff/landing guidance apparatus 200. The alarm section 102 may be designed to inform the level of emergency by intensifying sound or light in accordance with the approaching amount. In response to the alarm information, the pilot transmits the response to the takeoff/landing guidance system via the flying-object-side communication section 13 and the airport-side communication section 23.

In step S41, the control area state management section 204 monitors the condition of the virtual exclusive area r in the control area R even after transmission of the alarm information.

In step S42, the control area state management section 204 calculates the distance X between the virtual exclusive areas ra and rb, and determines whether the distance X is equal to or greater than the warning threshold value $X_{th}$. If $X \geq X_{th}$, the process proceeds to step S43. If $X<X_{th}$, the process proceeds to step S46.

In step S43, the control area state management section 204 confirms whether the response from the flying object 1a is received. If the response is not received, the process returns to step S40. If the response is received, the process proceeds to step S44. The presence/absence of the response may be determined based on whether the pilot of the flying object 1a has responded by voice to the calling voice from the airport controller, and whether the flying object 1a has returned to the given guidance route Ga.

In step S44, the control area state management section 204 stops transmission of the alarm information.

In step S45, the control area state management section 204 returns the state of the control area R from the "warning state" to the "normal state" to resume the monitoring process as shown in FIG. 7.

Meanwhile, if the process proceeds to step S46 from step S42, the control area state management section 204 confirms if the virtual exclusive areas ra and rb overlap with each other. If those areas do not overlap, the process returns to step S40. If those areas overlap, the process proceeds to step S47. As described with respect to the above-described step S16, basically, the virtual exclusive area setting section 202 sets the virtual exclusive area ra which does not overlap with the virtual exclusive area rb. In the case where the virtual exclusive area ra is set as required at least for the flight of the flying object 1*a* owing to proximity of the flying objects 1*a*, 1*b* to each other, or change in the state of the flying object (failure), the virtual exclusive areas rb and ra have to be set to overlap with each other (see FIG. 10). In such a condition, the process proceeds to step S47 from step S46.

In step S47, the control area state management section 204 sets the flying object 1*a* to an uncontrolled flying object as a cause of the overlapped virtual exclusive areas. The uncontrolled flying object refers to the flying object recognized as the one which is flying in the control area R without following instructions of the takeoff/landing guidance apparatus 200.

Alternative to the condition for this step, if the flying object has the number of re-setting operations of the virtual exclusive area greater than the number of re-setting operations of the virtual exclusive area r, which has been planned upon entry into the control area R, the flying object has the larger deviation amount from the guidance route G set upon entry, or the flying object has the larger amount of the latest deviation, those flying objects may be set to the uncontrolled flying objects.

In step S48, the control area state management section 204 changes the state information of the control area R from the "warning state" to the "emergency state" indicating higher emergency level. The process to be executed in the emergency state is described later.

Execution of the process in the warning state allows the flying object 1*a* largely deviating from the guidance route G to grasp the current situation, and urges the flying object 1*a* to be directed to the guidance route. This makes it possible to guide the flying objects 1*a*, 1*b* in the control area R while keeping sufficient distance between those flying objects. If the distance between the virtual exclusive areas ra and rb allows grasping of the situation that makes the flying object 1*a* largely deviating from the guidance route owing to some reason (obstacle, failure, or the like), the state of the control area R is brought into the emergency state to guide the flying object under the emergency state. In this embodiment, if the virtual exclusive areas r overlap with each other, the state of the control area is brought into the emergency state. It is also possible to bring the state into the emergency state by comparing the distance with a value set as the threshold value.

<Operation of Takeoff/Landing Guidance System Under Emergency State>

Described is an example of the process for operating the takeoff/landing guidance system in the case where the control area R is in the emergency state, the flying object 1*a* is set to an uncontrolled flying object (the flying object that does not follow the control instruction), and the flying object 1*b* is set to a controlled flying object (the flying object that follows the control instruction.

<<Process Relating to Uncontrolled Flying Object (Flying Object 1*a*)>>

Figure 11:
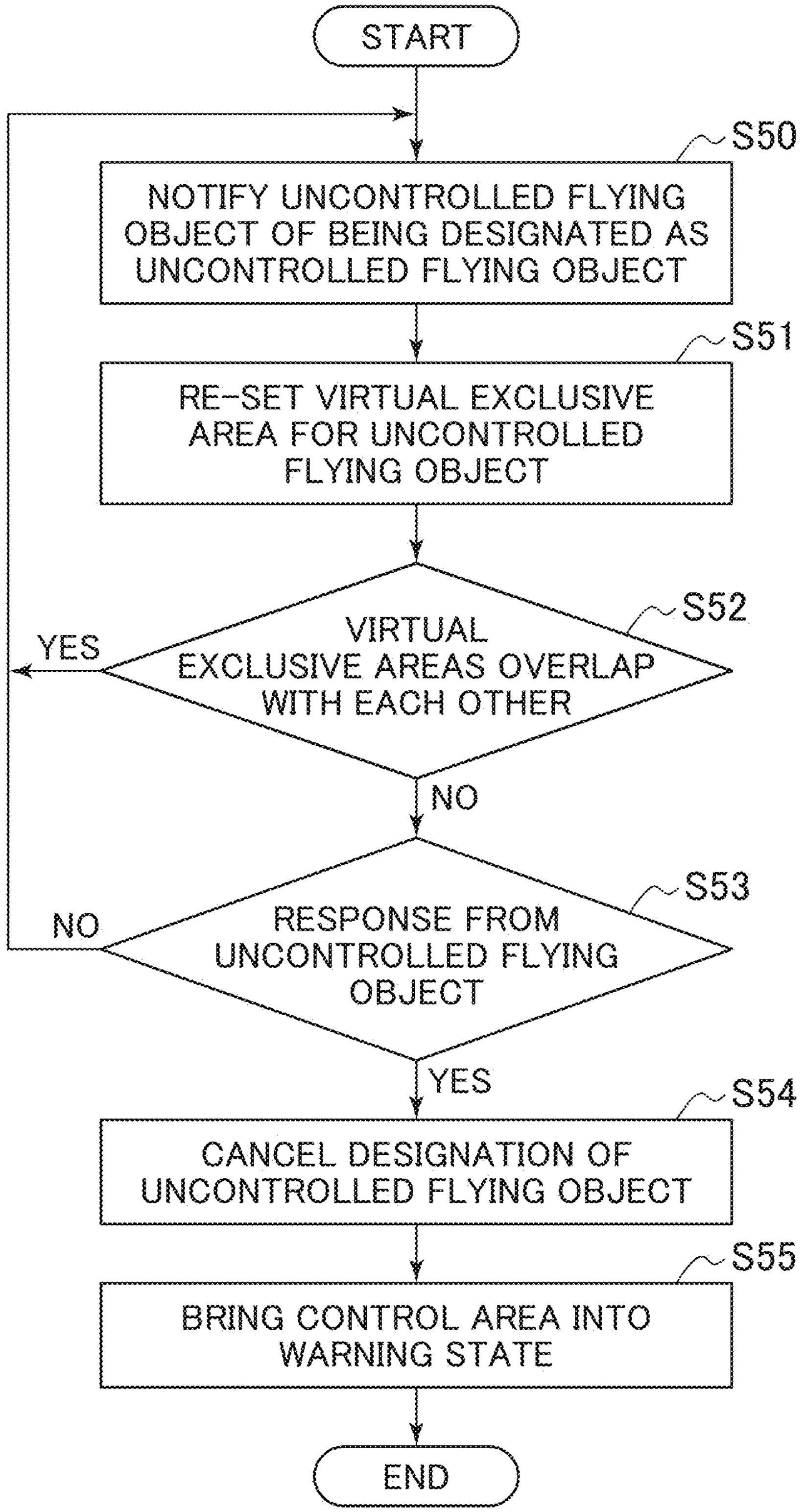
FIG. 11 is a flowchart for the process to be executed for an uncontrolled flying object in an emergency state.

FIG. 11 is a flowchart which indicates the process to be executed with respect to the uncontrolled flying object (flying object 1*a*) when the control area R is in the emergency state.

In step S50, the control area state management section 204 notifies the uncontrolled flying object (for example, flying object 1*a*) of the situation where it is designated as the uncontrolled flying object. At the timing as described above, the notification may be made by sound/light intensity output from the alarm section 102 of the flying object 1*a*.

In step S51, the virtual exclusive area setting section 202 re-sets the virtual exclusive area ra under the emergency state around the uncontrolled flying object 1*a*. The virtual exclusive area ra under the emergency state is set for avoiding collision between the uncontrolled flying object 1*a* and another flying object 1*b* as the controlled flying object. The virtual exclusive area may be set to be larger than the normally set area around the uncontrolled flying object 1*a* while keeping the controlled flying object 1*b* separated from the uncontrolled flying object 1*a* in unstable operation state by the distance sufficient to avoid collision.

In step S52, the control area state management section 204 re-confirms whether the virtual exclusive area ra re-set for the uncontrolled flying object 1*a* overlaps with the virtual exclusive area rb for another flying object. If those areas overlap with each other, the process returns to step S50. If those areas do not overlap, the process proceeds to step S53.

In step S53, the control area state management section 204 confirms whether the response is received from the uncontrolled flying object 1*a*. If the response is not received, the process returns to step S50. If the response is received, the process proceeds to step S54. The presence/absence of the response may be confirmed by the process similar to the one executed in step S43.

In step S54, the control area state management section 204 determines that the flying object 1*a* recognized as being uncontrolled has been brought into the controlled state, and cancels the designation of the uncontrolled flying object to the flying object 1*a*.

In step S55, the control area state management section 204 returns the state information of the control area R to the "warning state" from the "emergency state" to resume execution of the process under the warning state as shown in FIG. 9.

<<Process Relating to Controlled Flying Object (Flying Object 1*b*)>>

Figure 12:
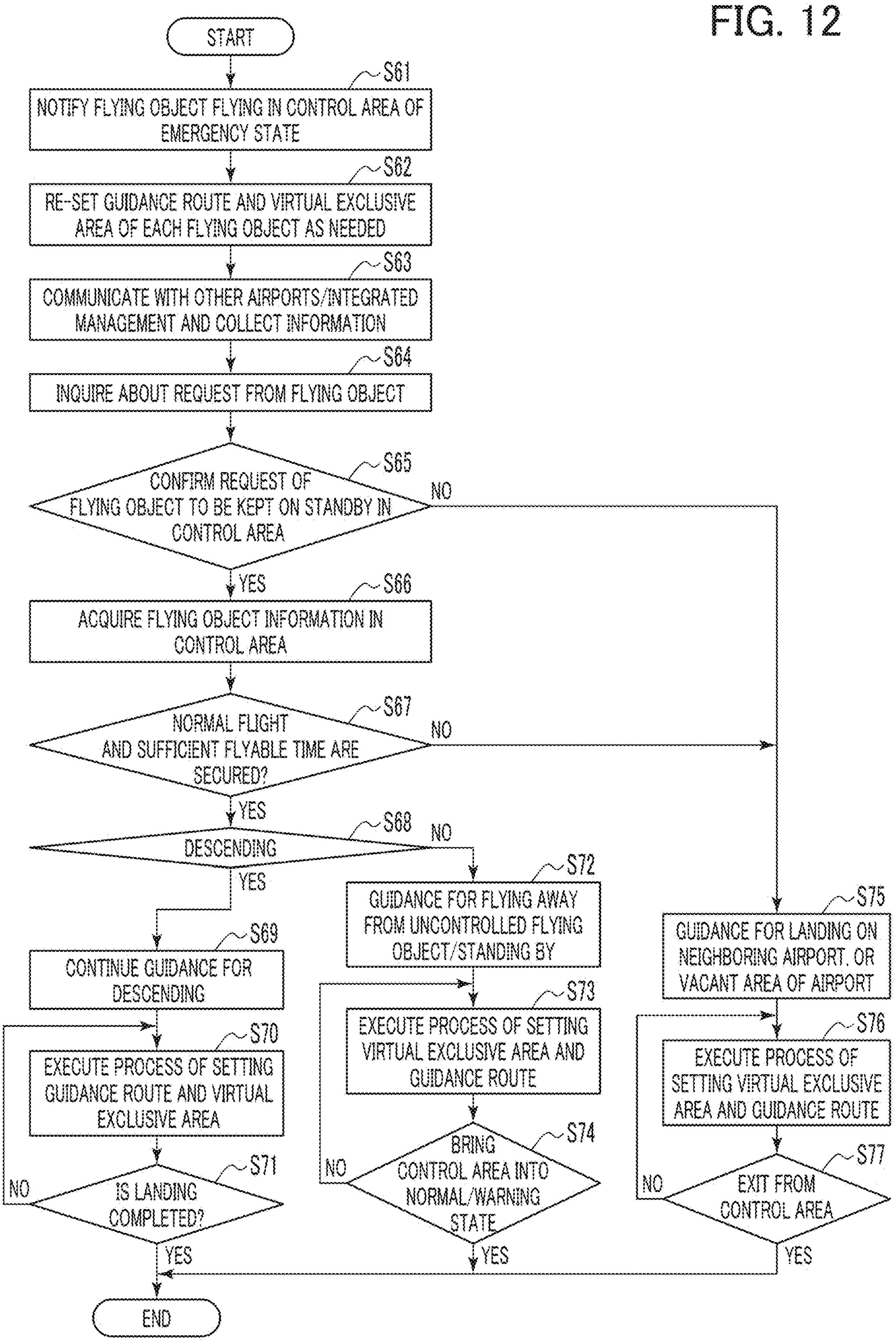
FIG. 12 is a flowchart for the process to be executed for a controlled flying object in an emergency state.

FIG. 12 is a flowchart which indicates the process to be executed with respect to the controlled flying object (flying object 1*b*) when the control area R is in the emergency state.

In step S61, the control area state management section 204 gives all the controlled flying objects in the control area R the information that the control area R has been brought into the emergency state.

In step S62, the virtual exclusive area setting section 202 and the guidance route setting section 203 also re-set the guidance route Gb and the virtual exclusive area rb for the flying object 1*b* under control as needed in the case where the virtual exclusive area rb overlaps with the virtual exclusive area ra for the uncontrolled flying object 1*a*.

In step S63, the control area state management section 204 communicates with a neighboring airport, or the server for integral management of the entire flight with respect to the state of the control area R. The information may be transmitted through another airport or the server for integral management of the entire flight, which is not shown. The information about the runway strip of another airport, and a vacancy condition of the control area R is collected simultaneously.

In step S64, the control area state management section 204 inquires the flying object 1*b* under control about its request to remain in the control area R or exit from the control area R.

In step S65, the control area state management section 204 confirms whether or not the controlled flying object 1*b* requires to be kept on standby in the control area R. In the case of the request to be kept on standby, the process proceeds to step S66. In the case of no request to be kept on standby, the process proceeds to step S75.

In step S66, the control area state management section 204 acquires the internal information of the controlled flying object 1*b*. The internal information refers to the information concerning flyable time of the controlled flying body 1*b*, remaining amount of battery or fuel, and presence/absence of the failure.

In step S67, the control area state management section 204 determines the state of the controlled flying object 1*b* based on the acquired internal information. Specifically, it is determined whether the controlled flying object 1*b* is allowed to make a normal flight, and has sufficient remaining flyable time. If it is determined that the controlled flying object 1*b* is in the normal state, the process proceeds to step S68; otherwise the process proceeds to step S75.

In step S68, the flying object position detection section 201 determines with respect to the flight state of the controlled flying object 1*b*. If the controlled flying object 1*b* is descending, the process proceeds to step S69; otherwise the process proceeds to step S72.

In step S69, the guidance route setting section 203 continuously guides the controlled flying objects 1*b* to descend.

In step S70, following the flowchart as shown in FIG. 5, the virtual exclusive area setting section 202 and the guidance route setting section 203 re-set the guidance route Gb and the virtual exclusive area rb for the controlled flying object 1*b*.

In step S71, the flying object position detection section 201 determines whether landing of the controlled flying object 1*b* has been completed. If the landing of the controlled flying object 1*b* has been completed, execution of the process is finished. If the landing has not been completed, steps S70 and S71 are repeatedly executed until completion of landing.

Meanwhile, assuming that it is determined that the flying object is not descending in step S68, and the process proceeds to step S72, if the controlled flying object 1*b* is near the uncontrolled flying object 1*a*, the takeoff/landing guidance apparatus 200 continuously guides the flying object 1*b* to fly away from the flying object 1*a*. If the flying object 1*b* is far from the uncontrolled flying object 1*a*, the flying object 1*b* is continuously guided to be kept on standby, or continuously guided as before.

In step S73, following the flowchart as shown in FIG. 5, the virtual exclusive area setting section 202 and the guidance route setting section 203 re-set the guidance route Gb and the virtual exclusive area rb for the controlled flying object 1*b*.

In step S74, the control area state management section 204 confirms whether the state of the control area R is returned to either the normal state or the warning state from the emergency state, and executes steps S73, S74 repeatedly until transition to either state.

If there is no request of standby in the control area R in step S65, or there is the failure state or no sufficient flyable state in step S67, the process proceeds to step S75. In step S75, the takeoff/landing guidance apparatus 200 guides the controlled flying object 1*b*, in accordance with its state, to the neighboring airport, or landing on a vacant area in the airport.

In step S76, following the flowchart as shown in FIG. 5, the virtual exclusive area setting section 202 and the guidance route setting section 203 set the guidance route Gb and the virtual exclusive area rb for the controlled flying object 1*b*.

In step S77, the takeoff/landing guidance apparatus 200 executes steps S76, S77 repeatedly until it is confirmed that the flying object 1*b* has left the control area R.

The thus configured takeoff/landing guidance apparatus 200 for executing the process as described above allows the flying objects 1 in the control area R to take off or land further safely while keeping those flying objects separated by the distance sufficient to prevent mutual collision. In the embodiment, replacement of the landing operation with the takeoff operation may provide the similar effect for improving safety. Especially the embodiment is applicable to the case where many flying objects are flying in the control area R, or descending/ascending of the vertical takeoff/landing aircraft with higher freedom degree. This makes it possible to improve the takeoff/landing efficiency, and the guiding efficiency.

In the first embodiment, the state transition of the control area R is performed based on the distance between the virtual exclusive areas r. The state transition may be performed based on the amount of deviation from the guidance route G set upon entry into the control area R instead of the distance between the virtual exclusive areas r. This provides substantially the same effect as described above.

In this embodiment, transition from the warning state to the emergency state is determined on the basis of the state where the virtual exclusive areas r overlap with each other. The transition to the emergency state may be determined on the basis of the relationship of $X<X_{em}$ derived from comparison of the distance X between the virtual exclusive areas with the emergency state threshold value $X_{em}$. This provides substantially the same effect as described above. As the emergency state represents the degree of emergency higher than that of the warning state. The emergency state threshold value $X_{em}$ for transition to the emergency state is set to the value smaller than the warning state threshold value $X_{th}$ for transition to the warning state.

Second Embodiment

Figure 13:
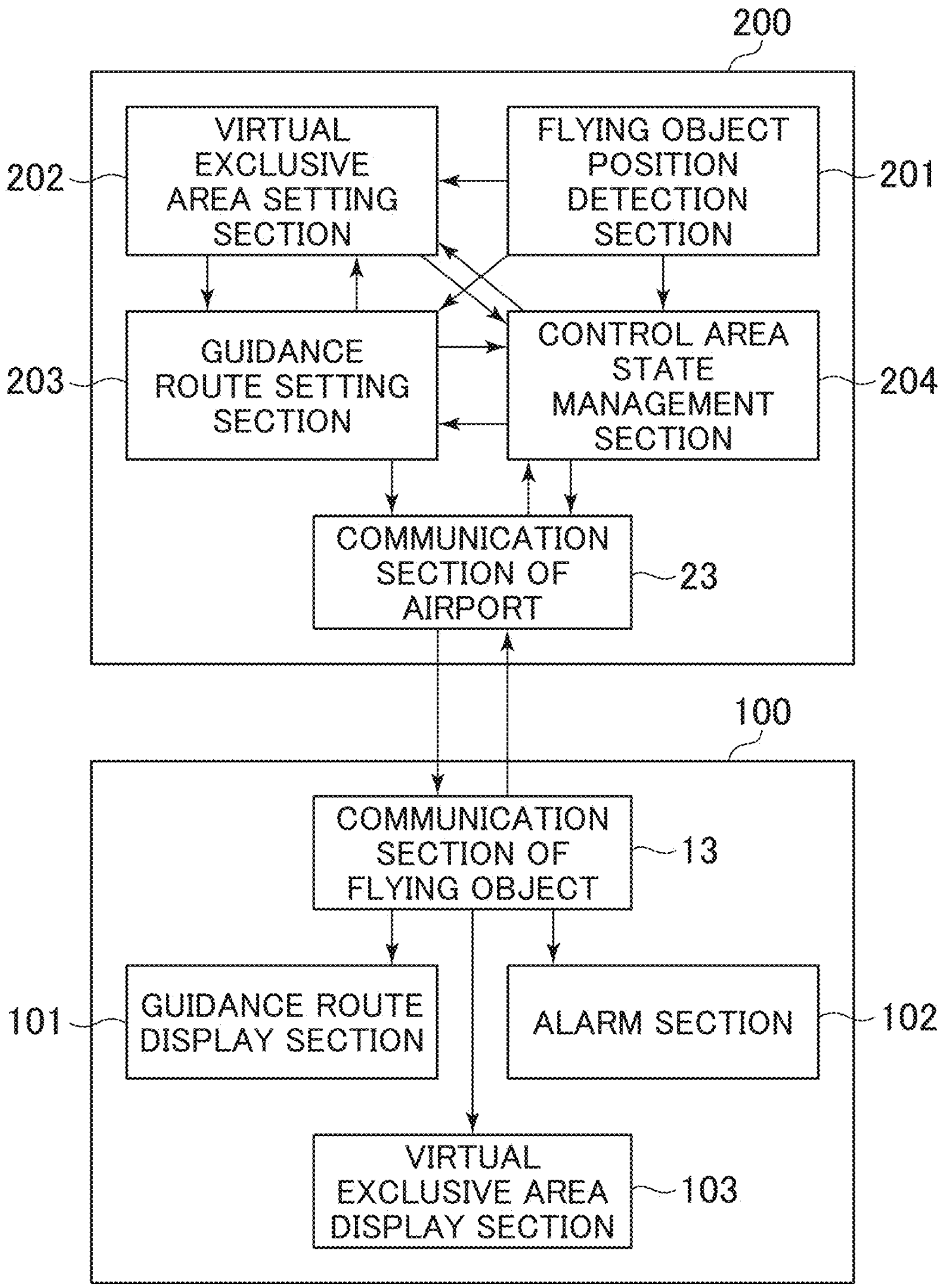
FIG. 13 is a functional block diagram of a flying object control device and a takeoff/landing guidance apparatus according to a second embodiment.
Figure 14:
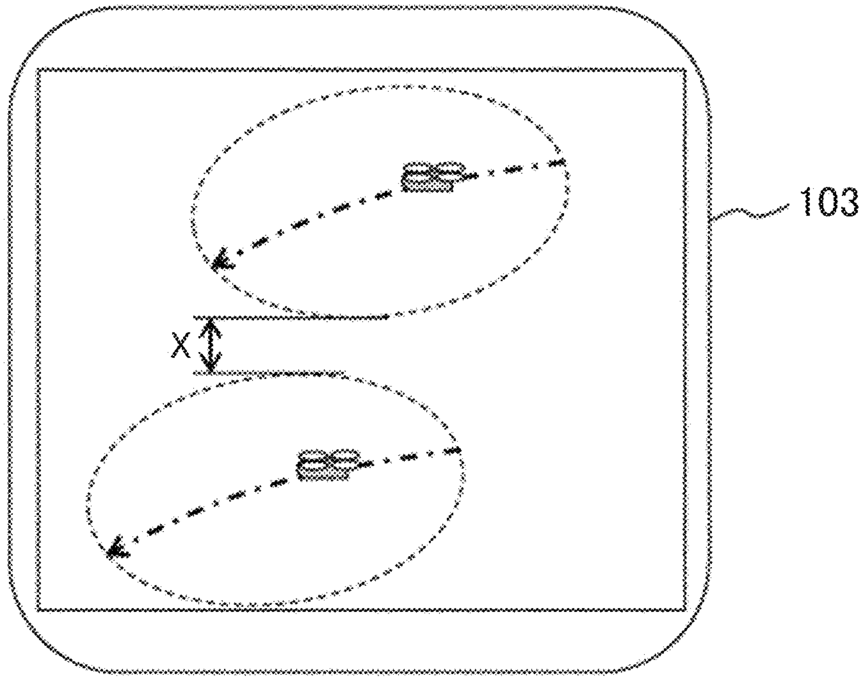
FIG. 14 is a conceptual view indicating an example of a display of a virtual exclusive area display device according to the second embodiment.

A second embodiment according to the present invention is described referring to FIGS. 13 and 14. FIG. 13 is a block diagram showing each structure of the flying object control device 100 and the takeoff/landing guidance apparatus 200 of the takeoff/landing guidance system according to the second embodiment. Structures common to those of the first embodiment are followed by the same reference signs, and detailed explanations of those structures are omitted.

The second embodiment is different from the first embodiment which allows only the takeoff/landing apparatus 200 to grasp the information about the virtual exclusive area G in the control area R in a virtual exclusive area display section 103 added to allow the flying object 1 to grasp and display such information. For example, the virtual exclusive area display section 103 may be configured to display each position of the flying objects 1*a*, 1*b* and the virtual exclusive areas ra, rb, information of the guidance routes Ga, Gb, and the distance X between the virtual exclusive areas r.

The embodiment allows the pilot of the flying object 1 to be informed of a positional relationship of the subject flying object 1 with the distance X between the virtual exclusive areas r before generation of the alarm information by the takeoff/landing guidance apparatus 200. This makes it possible to examine a path for avoiding the obstacle while considering the virtual exclusive area.

The second embodiment provides the effect which allows efficient takeoff/landing by reducing the potential that brings the control area into the warning state or the emergency state in addition to the effect derived from the first embodiment.

Third Embodiment

Figure 15:
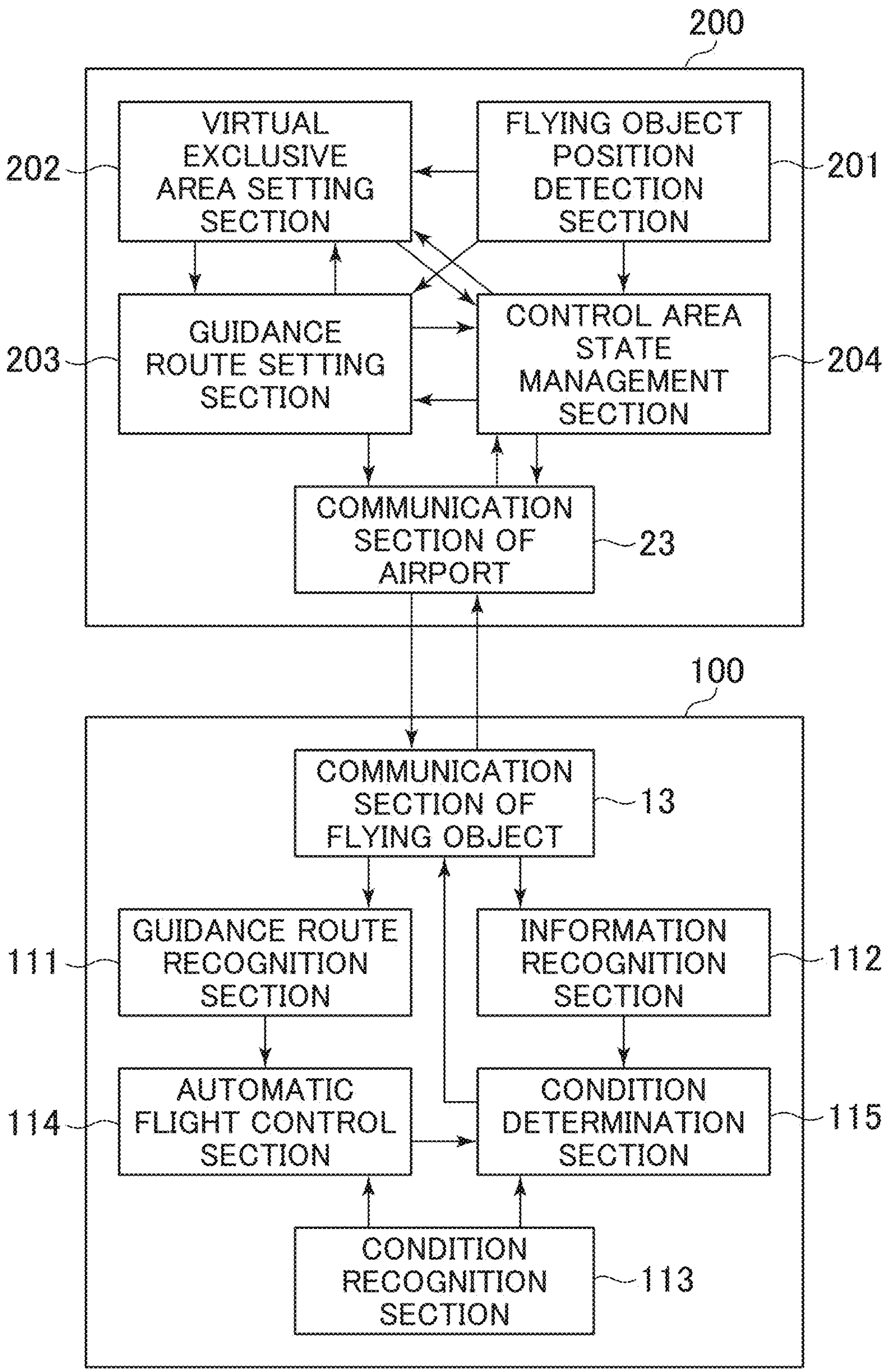
FIG. 15 is a functional block diagram of a flying object control device and a takeoff/landing guidance apparatus according to a third embodiment.

A third embodiment according to the present invention is described referring to FIG. 15. FIG. 15 is a block diagram showing each structure of the flying object control device 100 and the takeoff/landing guidance apparatus 200 of the takeoff/landing guidance system according to the third embodiment. Structures common to those of the embodiments are followed by the same reference signs, and detailed explanations of those structures are omitted.

The first and the second embodiments have been described on the assumption that the flying object 1 is operated by the pilot on board, or is remotely controlled by a human operator. This embodiment is described on the assumption that the flying object 1 is autonomously flyable. Accordingly, the flying object control device 100 includes a system for autonomous flight, which is provided with a guidance route recognition section 111, an information recognition section 112, a condition recognition section 113, an automatic flight control section 114, and a condition determination section 115 instead of the structures as described in the first and the second embodiments.

The guidance route recognition section 111 is a processing section which allows the flying object 1 to recognize the guidance route G information transmitted from the takeoff/landing guidance apparatus 200.

The information recognition section 112 is a processing section which recognizes the alarm information transmitted from the takeoff/landing guidance system.

The condition recognition section 113 is a processing section which recognizes the charging condition and each state of devices inside the flying object 1, external obstacle information derived from a not shown external sensor, and the condition inside/outside of the flying object 1 such as weather information.

The automatic flight control section 114 determines the flight path of the flying object 1 based on the information of the guidance route G given from the takeoff/landing guidance apparatus 200 and the information of inside/outside of the flying object 1 derived from the condition recognition section 113 to control flight of the flying object 1.

The condition determination section 115 is a processing section which determines the destination, and the response to the takeoff/landing guidance system based on the information given from the takeoff/landing guidance apparatus 200, information collected by the condition recognition section 113, and control information of the automatic flight control section 114.

Each processing flow is equivalent to the one as described in the first embodiment except that the processing flow as shown in FIGS. 9 and 11 is executed based on the response from the condition determination section 115 instead of the pilot. In the case of the system for automatic flight of the flying object 1, substantially the same effects as those of the first embodiment can be obtained.

LIST OF REFERENCE SIGNS

1: flying object, 11: main body, 12: rotary wing, 13: flying-object-side communication section, 100: flying object control device, 101: guidance route display section, 102: alarm section, 103: virtual exclusive area display section, 111: guidance route recognition section, 112: information recognition section, 113: condition recognition section, 114: automatic flight control section, 115: condition determination section, 2: airport, 21: runway strip, 22: control facility, 23: airport-side communication section, 24: environment information acquisition section, 200: takeoff/landing guidance apparatus, 201: flying object position detection section, 202: virtual exclusive area setting section, 203: guidance route setting section, 204: control area state management section, G: guidance route, R: control area, r: virtual exclusive area

The invention claimed is:

1. A takeoff/landing guidance apparatus for guiding a flying object in a control area for takeoff/landing operations, the takeoff/landing guidance apparatus comprising:

a flying object position detection section for acquiring a position of each flying object in the control area;

a guidance route setting section for setting a guidance route for each of the flying objects;

a virtual exclusive area setting section for setting a virtual exclusive area around each of the flying objects;

a control area state management section for managing a state of the control area; and a communication section for communication with each of the flying objects, wherein:

if a distance between the virtual exclusive areas is equal to or less than an alarm state threshold value, the control area state management section sets a state of the control area into a warning state, and the communication section transmits alarm information to the flying object;

if the virtual exclusive areas overlap with each other, or a distance between the virtual exclusive areas is equal to or less than an emergency state threshold value which is smaller than the alarm state threshold value, the control area state management section sets the state of the control area into an emergency state, and the communication section transmits information to the flying object largely deviating from the guidance route, the information indicating designation of the flying object as an uncontrolled flying object.

2. The takeoff/landing guidance apparatus according to claim 1, wherein the virtual exclusive area includes a current position of the flying object, and is set along the guidance route.

3. The takeoff/landing guidance apparatus according to claim 1, wherein:

the virtual exclusive area has a size necessary for the flying object to take an avoiding action; and when the flying object approaching an edge of the virtual exclusive area by a predetermined distance or greater, the virtual exclusive area setting section re-sets the virtual exclusive area.

4. The takeoff/landing guidance apparatus according to claim 1, wherein the communication section transmits the alarm information to a flying object as a cause of approach to the virtual exclusive area.

5. The takeoff/landing guidance apparatus according to claim 1, wherein if the control area is brought into an emergency state, the virtual exclusive area setting section sets a virtual exclusive area wider than a virtual exclusive area set around the uncontrolled flying object in a normal state.

6. The takeoff/landing guidance apparatus according to claim 1, wherein if the control area is set into an emergency state, the guidance route setting section sets a guidance route for a controlled flying object in accordance with the emergency state and a state of the flying object.

7. The takeoff/landing guidance apparatus according to claim 6, wherein:

if the controlled flying object is in a state before descending, the guidance route setting section sets a guidance route for guiding the flying object to the outside of the control area; and if the controlled flying object is descending, the guidance route setting section sets the guidance route to guide the flying object to make a landing.

8. The takeoff/landing guidance apparatus according to claim 6, wherein the guidance route setting section sets a guidance route for guiding the controlled flying object to make a flight in a direction away from the uncontrolled flying object.

9. The takeoff/landing guidance apparatus according to claim 1, wherein if the virtual exclusive areas do not overlap with each other, or a distance between the virtual exclusive areas is greater than the emergency state threshold value, and a response is received from the uncontrolled flying object, the control area state management section changes a state of the control area from the emergency state to the warning state, and the communication section transmits information to the flying object, indicating that designation of the uncontrolled flying object has been cancelled.

10. The takeoff/landing guidance apparatus according to claim 9, wherein if the distance between the virtual exclusive areas is greater than the warning state threshold value, and the response is received from the flying object, the control area state management section changes the state of the control area from the warning state to the normal state, and the communication section stops transmission of the alarm information to the flying object.

11. A takeoff/landing guidance system including the takeoff/landing guidance apparatus according to claim 1, and a flying object, wherein the flying object includes a guidance route display section for displaying the guidance route received from the takeoff/landing guidance apparatus, and an alarm section for notifying the alarm information which has been received from the takeoff/landing guidance apparatus.

12. The takeoff/landing guidance system according to claim 11, wherein the flying object includes a virtual exclusive area display section for displaying the virtual exclusive area received from the takeoff/landing guidance apparatus.

13. A takeoff/landing guidance method of guiding a flying object in a control area for takeoff/landing operations, the takeoff/landing guidance method comprising:

a step of acquiring a position of each flying object in the control area;

a step of setting a guidance route for each of the flying objects;

a step of setting a virtual exclusive area around each of the flying objects;

a step of managing a state of the control area;

a step of communicating with each of the flying objects, a step of setting a state of the control area into a warning state, and transmitting alarm information to each of the flying objects if a distance between the virtual exclusive areas is equal to or less than an alarm state threshold value; and a step of setting the state of the control area into an emergency state, and transmitting information to the flying object largely deviating from the guidance route if the virtual exclusive areas overlap with each other, or a distance between the virtual exclusive areas is equal to or less than an emergency state threshold value which is smaller than the alarm state threshold value.

* * * * *